US008185900B2

(12) United States Patent
Slomka et al.

(10) Patent No.: US 8,185,900 B2
(45) Date of Patent: May 22, 2012

(54) METHOD FOR THE REAL-TIME CAPABILITY ANALYSIS OF A SYSTEM BY SELECTIVELY USING APPROXIMATED OR ACTUAL SYSTEM EXPENSES FOR JOBS

(75) Inventors: Frank Slomka, Oldenburg (DE); Karsten Albers, Oldenburg (DE)

(73) Assignee: Inchron GmbH, Potsdam (DE)

( * ) Notice: Subject to any disclaimer, the term of this patent is extended or adjusted under 35 U.S.C. 154(b) by 1086 days.

(21) Appl. No.: 11/884,916

(22) PCT Filed: Mar. 3, 2006

(86) PCT No.: PCT/EP2006/001955
§ 371 (c)(1),
(2), (4) Date: Dec. 3, 2007

(87) PCT Pub. No.: WO2006/092318
PCT Pub. Date: Sep. 8, 2006

(65) Prior Publication Data
US 2008/0276247 A1    Nov. 6, 2008

(30) Foreign Application Priority Data
Mar. 4, 2005   (DE) .................. 10 2005 010 580

(51) Int. Cl.
*G06F 9/46* (2006.01)
(52) U.S. Cl. .................. 718/102; 718/100; 718/104
(58) Field of Classification Search .................. None
See application file for complete search history.

(56) References Cited

U.S. PATENT DOCUMENTS

| 5,606,695 A * | 2/1997 | Dworzecki ............... 705/7.12 |
| 5,964,829 A * | 10/1999 | Ozden et al. ............... 718/102 |
| 6,151,538 A * | 11/2000 | Bate et al. ............... 701/3 |
| 7,086,057 B2 * | 8/2006 | Hayashi ............... 718/102 |
| 7,444,638 B1 * | 10/2008 | Xu ............... 718/104 |

OTHER PUBLICATIONS

Stankovic, J.A. et al; "Implications of Classical Scheduling Results for Rea-time Systems"; Computer, vol. 28, Issue 6, Jun. 1995, pp. 16-25.
Devi U C; "An Improved Schedulability Test for Uniprocessor Periodic Task Systems" ; Real-Time systems, 2003. Proceedings. 15$^{th}$ Euromicro Conference on Jul. 2-4, 2003; pp. 23-30.
Albers K et al; "An Event Stream Driven Approximation for the Analysis of Real-Time System" Real-Time systems, 2004, Proceedings. 16$^{th}$ Euromicro Conference on Jun. 30-Jul. 2, 2004 pp. 187-195.
Chakraborty S. et al; "Approximate Schedulability Analysis" Proceedings Real-Time Systems Symposium on Dec. 3-5, 2002; pp. 1-10.
Baruah Sk et al; "Preemptively Scheduling Hard-Real-Time Sporadic Tasks on One Processor" Proceedings of the Real time Systems Symposium. Dec. 5-7, 1990, pp. 182-190.
Albers K et al; "Efficient Feasibility Analysis for Real-Time Systems With EDF Scheduling" Proceedings Munich, Germany Mar. 7-12, 2005, pp. 492-497.

* cited by examiner

*Primary Examiner* — Meng An
*Assistant Examiner* — Bing Zhao
(74) *Attorney, Agent, or Firm* — Manabu Kanesaka

(57) ABSTRACT

The invention relates to a method for the real-time analysis of a system, especially a technical system, which is to process tasks ($\tau$). A job that is defined by processing of a task ($\tau$) generates system expenses. In order to create a particularly quick and accurate method, an approximation of the method is cancelled when it is considered that an interval ($I$, $I^r$, $I^r n_\tau$) cannot be processed in real time, the system expenses being taken into account instead of the approximate value for at least one job of a task ($\tau$).

2 Claims, No Drawings

METHOD FOR THE REAL-TIME CAPABILITY ANALYSIS OF A SYSTEM BY SELECTIVELY USING APPROXIMATED OR ACTUAL SYSTEM EXPENSES FOR JOBS

BACKGROUND OF THE INVENTION AND RELATED ART STATEMENT

The invention relates to a method for the real-time analysis of a system, in particular of a technical system.

With a large number of technical systems, such as embedded real-time systems or embedded computer systems, it is necessary that the system processes tasks within a specified time interval which is also designated with a time limit or deadline, i.e. that it is real-time capable. Tasks which are to be processed by the system are collectively referred to below as a "task system".

Real-time analysis can be used for automating the development of real-time systems. Furthermore, it is possible to conduct a real-time analysis while the task system is being processed by the system. If during the processing it is determined that specified real-time conditions cannot be maintained by the system, measures can be introduced, for example, for a limited but essentially secure processing of the task system. Measures of this type can for example consist of transferring individual tasks onto other systems or system components in order to process them. It is also possible to postpone the processing of individual tasks in order to give preference to other tasks.

Methods for real-time analysis can be divided into sufficient and necessary methods. With a necessary method, a system can consistently be classified without error for a specified task system. By contrast, with a sufficient method, it can be the case that the system is erroneously specified as being not real-time capable for a specified task system, even though the system would actually be in a position to process the task system while maintaining the specified real-time conditions.

A necessary method for the real-time analysis for a processor of a computer is known from S. Baruah, A. Mok, L. Rosier: "Preemtively Scheduling Hard-Real-Time Sporadic Tasks on One Processor" in Proceedings of the Real-Time Systems Symposium, 182-190, 1990. With the method, a maximum test interval, i.e. a maximum time interval is initially calculated for a specified task system. Then a time interval which is inserted in the test interval is selected according to a specified criterion and the computing time required for the tasks to be processed within the time interval is computed by the processor. Then the computing time is compared with the length of the time interval. A task system is not classified as being processable in real-time when the computing time is greater than the length of the time interval. If the system is real-time capable for the selected time interval, a further time interval which is inserted in the test interval is checked. The procedure is continued either until it is determined that the system is not real-time capable, or until all time intervals which fulfil the criterion have been checked. With the method, only those time intervals need to be checked which lie within the test interval. However, it can be the case that many time intervals are checked unnecessarily, as a result of which the run time for the method is prolonged unnecessarily.

A method is known from J. A. Stankovic, M. Spuri, K. Ramamritham, G. C. Buttazzo: "Deadline Scheduling for Real-Time Systems EDF and Related Algorithms", in Kluwer Academic Publishers, Boston/Dodrecht/London, 1998, p. 42-50, in which the number of time intervals to be checked can be reduced as compared with the method according to Baruah et. al. Only those time intervals are taken into account in which the computing time of the system can change. A disadvantage of this method is that its run time is dependent not on the size of the task system, but also on the relationship of parameters of the tasks such as the period, deadline or execution time. It is known from Karsten Albers, Frank Slomka: "An Event System driven Approximation for the Analysis of Real-Time Systems" in IEEE Proceedings of the 16$^{th}$ Euromicro Conference on Real-Time Systems 2004 (ECRTS'04), Catania, Italy, p. 187-195, that a real-time analysis for a task system which contains both tasks with small and large periods requires a long run time with the method according to Stankovich et. al. Furthermore, with task systems with a high degree of work load of the system, very many time intervals must be checked. This results in a long run time for the method.

A sufficient effectual method for real-time analysis is known from M. Devi: "An Improved Schedulability Test for Uniprocessor Periodic Task Systems", in IEEE Proceedings of the 15$^{th}$ Euromicro Conference on Real-Time Systems, 2003. This method is a further development of the method described above. The run time for the method is essentially dependent only on the size of the task system. A method of this type is also known as a "method with polynominal complexity". With the method according to Devi, it can be the case, however, that a system which is in fact real-time capable for a task system is not recognised as such, and is erroneously classified. This is the case with task systems which enable an optimum utilisation of the system, for example.

A further method for real-time analysis is known from S. Chakraborty, S. Künzli, L. Thiele: "Approximate Schedulability Analysis", 23$^{rd}$ IEEE Real-Time Systems Symposium (RTSS), IEEE Press, 159-168, 2002. The method is an approximation method in which a maximum error can be firmly specified. In order to check the real-time capability, a firmly specified number of time intervals are checked. The maximum number of errors depends on the number of time intervals. The time intervals can be maintained by a minimum time interval being successively enlarged, in each case by a specified amount. For each time interval, a precise calculation is made of the computing time required by the system for processing the tasks to be processed within the time interval. The computing time is compared with a system capacity which is made available to the system within the next smallest time interval in order to process the tasks. On the basis of the comparison, it is determined whether the system is real-time capable. A disadvantage of the method is that the comparison leads to an error which can no longer be fully compensated by a large number of time intervals. Many systems are erroneously classified as being not real-time capable for a specified task system. A further disadvantage is that when a small maximum error is selected, the run time of the method can be longer than that of a precise method. With the method described above which is known according to the prior art, it is necessary to determine a precision or an error in the method before the method is implemented. A selected error which is too large for a specified task system can lead to the system being erroneously classified as being not real-time capable. When a selected error is too small, this leads to a large degree of time and effort and too long run times.

SUMMARY OF THE INVENTION

The object of the invention is to avoid the disadvantages according to the prior art. In particular, a particularly fast and precise method is to be provided for real-time analysis.

According to the invention, the following steps are applied with a method for the real-time analysis of a system, wherein tasks are to be processed by the system, and wherein a job which is defined by the processing of a task results in system expenses:

a) specifying of a time interval in which tasks are to be processed by the system;
b) determining of a limit value for system expenses, which are available within the time interval for processing the tasks;
c) determining of the overall system expenses for the system expenses which arise as a result of the jobs occurring within the time interval, wherein in order to determine the overall system expenses
   i) for jobs which form a first quantity there are used the system expenses, and
   ii) for jobs which form a second quantity there is in each case used an approximate value for the system expenses, wherein the approximate value is greater than the corresponding system expenses;
b) comparing of the determined overall system expenses with the limit value, wherein
   i) the time interval is then regarded as being processable in real-time when the overall system expenses do not exceed the limit value, wherein
   ii) when the overall system expenses exceed the limit value, the second quantity, if this is not empty, is reduced in such a manner that in order to further determine the overall system expenses for at least one job of a task of the second quantity, the system expenses are taken into account instead of the approximate value, and at least the steps according to c) and d) are executed repeatedly, and wherein
   iii) the real-time capability of the system is regarded as being not present when the second quantity is empty and the overall system expenses exceed the limit value.

With the method according to the invention, the system expenses are used for a job of the first quantity, and an approximate value is used for a job of the second quantity. The approximate value for the system expenses of a job can be determined on the basis of the system expenses of the job. The system expenses can be a processing time or computing time, or a working load of the system. If the second quantity is not empty, the method is an approximation method. The precision of the method depends on the cardinal number of the second quantity. The precision or "degree of approximation" of the method is a measure for the deviation of the approximation method from a precise method. As the degree of approximation increases, the effort for executing the approximation method, e.g. the run time, generally also increases. With the method according to the invention, the degree of approximation can be dynamically altered during the method. An increase in the degree of approximation can be achieved by reducing the second quantity in the step according to d) ii). A reduction/increase in the first or second quantity is regarded as being a reduction/increase in the cardinal number of the first or second quantity.

In order to keep the run time of the method as low as possible, the cardinal number of the second quantity is selected as large as possible already at the start of the method. As a result, the method starts with a low degree of approximation, a low level of effort and a short run time. The degree of approximation can be dynamically increased by reducing the second quantity while the method is being implemented. As a result of the reduction in the second quantity, the system expenses are used instead of the approximate value in order to determine the overall system expenses at least for one job of the second quantity. I.e., at least one job of the second quantity is assigned to the first quantity, which is increased as a result. With the repeated implementation of the steps according to c) and d), the system expenses of the job are used instead of its approximate value. Since the approximate value is greater than the system expenses, the overall system expenses can be reduced by an error contained in the approximate value. As a result of the reduction in overall system expenses, it can be possible that these are less than the limit value. In this case, the task system can be classified as being processable in real-time by the system for the time interval checked. If the overall system expenses are higher than the limit value, despite the reduction, the second quantity can again be reduced and the first quantity can be further increased. Then, the real-time capability can again be checked within the time interval on the basis of the reduced second quantity and the increased first quantity. This procedure, in which the degree of approximation is dynamically increased, can be continued iteratively. With a predetermined degree of approximation, the system would by contrast already be classified as being not real-time capable for the task system when the limit value was first exceeded. With the method according to the invention, task systems can be correctly classified to a greater degree of reliability. Furthermore, as a result of the possibility for dynamic alteration of the degree of approximation, the effort and the run time of the method can be significantly reduced.

The system is in particular a technical system such as an embedded real-time or computer system with one or more computers, electronic circuits and control units etc., which are connected with each other.

DETAILED DESCRIPTION OF THE PREFERRED EMBODIMENTS

According to an embodiment of the invention, the second quantity is increased if the overall system expenses are less than the limit value. If the second quantity is increased, the number of approximated jobs increases. As a result, the degree of approximation is reduced and the run time of the method can be reduced. The method can be executed even more quickly and efficiently.

According to a further embodiment of the invention, a changeable test limit is assigned to at least one task, wherein for tasks the test limit of which is exceeded within the time interval the approximate value for the jobs of the task is used, and wherein, when the overall system expenses are higher than the limit value, at least one test limit for a task is changed in such a manner that the second quantity is reduced. On the basis of the test limits, the ratio of the approximate values to the overall system expenses can be limited or displaced. The ratio can be used e.g. to determine a current error or a current degree of approximation, and can be forwarded to the user. The cardinal number of the second quantity and the resulting degree of approximation could be changed in a particularly simple manner by increasing or reducing the test limits. By increasing the test limit(s), the degree of approximation can be increased. Advantageously, the test limit for a task represents the number of jobs in the task. The test limit is reached when a corresponding number of jobs lie within the time interval of the quantity. It is particularly advantageous, at least initially, to select the same test limit for all tasks, e.g. the same number of jobs. On the other hand, it is also possible that the user specifies an initial maximum number of errors with which the method should begin, and that the test limits are determined on this basis. When the overall system expenses are lower than the limit value, the test limit of a task in the first quantity can be changed in such a manner that the second quantity is increased. The run time and the effort required for the method can be reduced.

Preferably at least one numerical value, such as a test limit, is increased, and preferably doubled, in order to reduce the second quantity, and/or at least one numerical value such as a test limit is reduced in order to increase the second quantity. A change in the numerical value can for example be achieved in particularly fast and simple manner by means of a predetermined computing operation.

According to an embodiment of the invention, if the overall system expenses are greater than the limit value, the method is continued with an already checked time interval in which the overall system expenses were less than the limit value. In doing so, any time interval can be selected in which the overall system expenses were less than the limit value. With this embodiment, results from already checked time intervals can be used. A repeated execution of the method from the beginning can be avoided. The method can be executed in a particularly fast and efficient manner.

According to an embodiment of the invention, one of the following properties of the tasks is taken into account in order to reduce the second quantity: the level of the actual system expenses, the share of errors of the approximated system expenses within an overall error of the method. It is possible to cancel the approximation for jobs which cause the highest system expenses. Similarly, the approximation can initially be cancelled for those jobs which have the greatest share of errors. In this way, the overall system expenses can be reduced by the greatest amount possible.

According to a particularly preferred embodiment of the invention, the real-time capability is checked for time intervals in succession with increasing size. If a time interval is processable in real-time, all lesser time intervals can be regarded as also being processable in real-time. If the overall system expenses exceed the limit value in a checked time interval, the method can be continued in the same time interval with a higher degree of approximation. If the time intervals are checked in order of increasing size, the overall system expenses can be particularly simply defined, e.g. by adding up the system expenses and the approximate values.

According to a further embodiment of the method, the tasks are grouped in order to determine the overall system expenses. A procedure of this type is particularly useful if these are at different priority levels.

According to an embodiment of the invention, at least one task is repeatedly processed by the system. Preferably at least one task is processed with a minimum time interval or periodically with one period.

According to a further embodiment of the invention, the system expenses are calculated on the basis of a processing time required for processing the tasks. It is also possible that the system expenses are calculated on the basis of an upper limit for the longest processing time required. Furthermore it is possible to calculate the system expenses of the system on the basis of the work load of an execution component of the system preferably of a CPU required for processing the jobs.

According to an embodiment of the invention, the limit value is determined on the basis of a capacity of the system which is available within the time interval. For example, it is possible to determine the limit value with the aid of the capacity of a processor or a CPU. If a constant capacity is assumed, the limit value can be determined by multiplying the length of the time interval by the capacity. During this determination, a time interval of double the length is assigned the double limit value. It is also possible to describe the limit value using a quantity of system expenses which can be processed by the CPU within the time interval assigned to the limit value. Furthermore, for different time intervals, different limit values can be used. As a result, processors with a fluctuating capacity can be better and more precisely modelled. It is also possible to assign different limit values to just a few time intervals. Preferably the limit values are assigned in order of increasing size to time intervals which also increase in size. A limit value which is determined for a time interval can be used in order to determine the limit value of a larger time interval, e.g. the next largest interval. Compared with the method with fixed limit values, a significantly more precise analysis is possible, with a lower additional calculation time.

According to an embodiment of the invention, the overall system expenses for discreet time intervals which comprise a start and end time point are determined, wherein the end time point is the end of a time limit by which time a job in a task must have been processed at the latest. With discreet time intervals, calculations can be made in a simple numerical system. No extensive floating decimal operations are required. When time limits which are known are used as end time points, the time intervals can be determined in a particularly simple manner. With the same starting point of the time intervals, it is only necessary to equate the end time point with a time limit of a job, e.g. a job which has not been approximated.

According to an embodiment of the invention, the approximate value for a job is calculated on the basis of a specific work load of the system. The specific work load in turn can be calculated as a quotient from the processing time and the period of the task. It is also possible that the specific work load is taken into account for an interval which is less than the time interval.

According to a particularly preferred embodiment of the invention, that task is first processed by the system for which the end of the time limit is closest in time. It is also possible for the system to process the tasks in a sequence which is predetermined by a priority. Further it is possible to describe the task by means of a event-flow-model.

According to an embodiment of the invention, the following algorithm is used:

---

ALGORITHM ALLApprox

If $U > 1 \Rightarrow$ not feasible
$\forall \tau_i \epsilon \tau_n$: testlist.add $(\tau, p_i + d_i)$
WHILE (testlist $\neq$ { })
    $\tau_i, I_{act}$ = testlist.getNext ( )
    $R_{act} = R_{act} + c_{act} + (I_{act} - I_{old}) * U_{approx}$
    WHILE ($R_{act} > I_{act}$)
        IF (Approxlist = { }) => not feasible
        $\tau'$ = ApproxList -> getAndRemoveFirstTask;
        $U_{approx} = U_{approx} - c_i / p_i$
        $R_{act} = R_{act} - $ app $(I_{act}, \tau')$
        Testlist.add $(\tau', \text{NextInt}(I_{act}, \tau'))$
    END WHILE
    $U_{approx} = U_{approx} + c_i / p_i$
    ApproxList.add(t);
END WHILE
=> not feasible A further embodiment of the invention offers the following algorithm:

---
ALGORITHM DynamicError
---

```
If U > 1 not feasible
I_max = minimum feasibility interval
∀τ_i∈τ_n: testlist.add (τ, p_i + d_i)
WHILE (testlist ≠ { } AND I_act < I_max)
    τ_i, I_act = testlist.getNext ( )
    R_act=R_act + c_act + (I_act – I_old) *U_approx
    WHILE (R_act > I_act)
        IF (Approxlist = { } ) => not feasible
        increase level;
        ∀τ_i∈τ_rev : U_approx = U_approx – c_i / p_i
            R_act = R_act – app (I_act, τ_i)
    END WHILE
    IF (I_act > T_max (τ) )
        Testlist.add (τ, I_act + p_i)
    ELSE
        U_approx = U_approx + c_i / p_i
        ApproxList.add(t);
    I_old = I_act
END WHILE
=> feasible
```

Here, $\tau_{rev}$ refers to the quantity of tasks for which the corresponding system expenses are taken into account with a further algorithm cycle, instead of the respective approximate values.

According to a further provision of the invention, a computer program product is provided which comprises program code means which can be read by a computer in order to execute the method according to the invention on a computer system. Furthermore, a digital storage medium is provided with a program which is stored on it and which can be read by a computer for the execution of the method according to the invention. Furthermore, a computer system which comprises a digital storage medium is provided with program code means which are stored on said medium and which can be executed by a computer in order to execute the method according to the invention.

Advantages of the computer program product, the digital storage medium and the computer systems can be derived from the advantages of the method described above.

The method according to the invention will now be explained in greater detail below with reference to exemplary embodiments.

With a first example, an approximation method for the real-time analysis of a system is considered. A task system $\tau_n$ with n tasks $\tau$ is provided, wherein n is a natural number. A computing time which is required by the system in order to process the task $\tau$ is used as system expenses which arise as a result of the processing of task $\tau\in\tau_n$. Time intervals I are checked which are less than a predetermined maximum time interval $I_{max}$. The time intervals I have a shared starting time point. An end time point of a time interval I is given by an end of a time limit dr of a job of a task $\tau$ of the task system $\tau_n$. In other words, the job must have been processed by the end time point at the latest. For a task $\tau$ $n_\tau$ time intervals $I^\tau_1 \subset \ldots \subset I^\tau_{n_\tau} \subseteq I_{max}$ are selected. The time intervals $I^\tau_1, \ldots$ or $I^\tau_{n_\tau}$ comprise 1, 2, ... etc. or $n_\tau$ jobs of task $\tau$. For each task $\tau$, a test limit $T_{max}(\tau)$ is furthermore determined which is dependent on the parameters of the task $\iota$, for which the following applies: $T_{max}(r) \subset I_{max}$. When determining an overall computing time, the actual computing time of the job in the task r is used for the time intervals $I \subset T_{max}(\tau)$. For time intervals I with $T_{max}(\tau) \subset I \subset I_{max}$, an approximate value is used for the computing time which is greater than the computing time. In a similar manner, corresponding time intervals are selected for each task in the task system. The numbers $n_\tau$ and the error of the approximation method are dependent on each other. The selected time intervals are checked in increasing order. In each case, the overall computing time is determined which is required by the system in order to process the jobs which arise therein, and it is then compared with a limit value for the computing time in the respective time interval. The system is real-time capable when the overall computing time is less than the limit value. During the analysis of a time interval $I^{\tau'}n_\tau$ of a task $\tau'$, for which $T_{max}(\tau) \subset I^{\tau'}n_\tau$ applies, the approximated computing time of the job of the task $\tau$ is taken proportionally into account. The analysis is continued until the maximum time interval $I_{max}$ has been exceeded or reached, i.e. until all of the time intervals which have been selected for the tasks in the task system $\tau_n$ as described above have been checked. An error occurs during the determination of the overall computing time due to the approximate value for the computing time. It can therefore be the case that the determined overall computing time is greater than the computing time which is actually required by the system which can be determined for example with a precise method.

In order that the run time of the method and the number of time intervals to be checked is as low as possible, a small maximum number $n_\tau$ of time intervals per task $\tau$, i.e. a low test limit $T_{max}(\tau)$ is used to start with, for example $n_\tau=1$. If the overall computing time which contains an error exceeds a limit value for the computing time available in the checked time interval, the test limit $T_{max}(\tau)$ is displaced or increased, and correspondingly, the maximum number $n_\tau$ of time intervals is increased for at least one task $\tau$. Subsequently, the real-time capability for the time interval is again checked, wherein the overall system expenses are re-calculated and compared with the limit value. If the overall system expenses are less than the limit value, the next largest time interval can be checked. If the overall system expenses continue to exceed the limit value, one or more test limits $T_{max}(\tau)$ can in turn be displaced. The test limits $T_{max}(\tau)$ of the tasks $\tau$ can be displaced successively until the condition $T_{max}(\tau)=I_{max}$ is met. If this condition is met and the overall system expenses continue to exceed the limit value, the system is not real-time capable.

The test limit $T_{max}(\tau)$ can for example be increased by doubling the number $n_\tau$. For the method, precisely those displacements are significant with which at least one test limit $T_{max}(\tau)$ is displaced beyond the end time point of the time interval which has been checked. This has an effect on the number of jobs for which an approximate value for the computing time is used in the time interval. When the number of approximated jobs is reduced, the overall computing time and the error proportion of the jobs which are no longer approximated is reduced. As a result, due to an increase in the degree of approximation, the determined overall computing time can be reduced. It can be the case that due to this reduction, the determined overall computing time falls below the limit value. If this can be achieved, the task system can be accepted for the checked time interval.

With a second exemplary embodiment of the method, time intervals I are checked in order of size in increasing order. If the checked time interval I is classified as being processable in real-time, this also applies to all smaller time intervals I. If the checked time interval I is classified as being not processable in real-time, the system expenses are used instead of the approximate value for at least one approximated job of a task $\tau$. Here, a repeated check of the already checked time interval I is sufficient. It is not absolutely necessary that the real-time analysis be continued with a lower time interval I or repeated from the beginning.

The method can be realised as follows:

With the method, a specific work load U of the tasks system $\tau_n$ can be calculated as follows:

$$U = \sum_{\tau_i \in \tau_n} \frac{c_i}{p_i}$$

Here, $\tau_i$, i=1, 2, ... are tasks from the task system $\tau_n$, $C_i$ is the system costs such as the computing time required e.g. to process the task $\tau_i$ by the system and $p_i$ is a period or a minimum time difference of the task $\tau_i$.

In a first step, a check is made as to whether the specific work load U exceeds the value 1. In this case, the task system is not real-time capable and the real-time analysis can be ended.

In a second step, one or more maximum test intervals $I_{max}$ are defined. Furthermore, variables which are required in order to execute the method are initialised, e.g. the overall system expenses as a cumulated current computing time $R_{act}$ for the current time interval $I_{act}$. A time interval which precedes the current time interval $I_{act}$ is referred to as $I_{old}$. The respective first time interval $I^{\tau_i}_1$, the task $\tau_i$ of the task system $\tau_n$ is added to a test list, TestList. The first time interval $I^{\tau_i}_1$, is derived from a time limit $d_\tau$ of the first job of each individual task $\tau_i$. Furthermore, a permitted number Anz of time intervals is determined. Preferably, at the beginning of the method, the number Anz is set to 1 and a list, ApproxList, of tasks $\tau$, the jobs of which are approximated, is empty.

In a third step, the following instructions are repeatedly executed until either the test list TestList is empty, or until the maximum test interval has been exceeded or reached, i.e. when the following applies, for example: $I_{act} \geq I_{max}$.

As a first instruction, the current time interval $I_{act}$ is determined. The current time interval $I_{act}$ is equated with the smallest time interval from the test list TestList. The lowest time interval is removed from the test list TestList. Should this time interval be included more than once in the test list TestList for different tasks $\tau_i$, only one entry is deleted. $\tau_{act}$ refers to the task belonging to the current time interval $I_{act}$. As the next instruction, the computing time $R_{act}$ is calculated using the following formula:

$$R_{act} = R_{old} + C_{act} + U_{approx} \times (I_{act} - I_{old})$$

Here, $U_{approx}$ refers to a specific work load of the approximated tasks. $U_{approx}$ can be calculated using the following formula:

$$U_{approx} = \sum_{\tau_i \in ApproxList} \frac{c_i}{p_i}$$

$U_{approx}$ can also be stored in a variable and, if required, can be updated during the real-time analysis.

In a further instruction, the cumulated current computing time $R_{act}$ is compared with a limit value $GW_{act}$ for the current time interval $I_{act}$. The limit value $GW_{act}$ can for example be equated with the interval length of the current time interval $I_{act}$.

If in a first case the computing time $R_{act}$ is less or equal to the limit value $GW_{act}$, the real-time evidence for the time interval $I_{act}$ has been provided. Via a subsequent instruction, a check is made as to whether the test limit $T_{max}(\tau_{act})$ of the current task $\tau_{act}$ has been reached or exceeded. The test limit $T_{max}(\tau_{act})$ depends on the current permitted number Anz of time intervals. For periodic tasks, the check can be conducted using the following formula:

$$I_{act} \geq (Anz-1) \times p_{act} + d_{act}$$

Here, $d_{act}$ refers to the current time limit and Pact refers to the period of the task $\tau_{act}$. If the test limit $T_{max}(\tau_{act})$ has been reached, in a next instruction, the task $\tau_{act}$ is added to the list ApproxList of approximated tasks. If necessary, $U_{approx}$ is updated.

If the test limit $T_{max}(\tau_{act})$ has still not been reached, a next largest time interval $I_{next}$ is added for the task $\tau_{act}$ into the test list TestList. For periodic tasks, the time interval $I_{next}$ can be determined as follows:

$$I_{next} = I_{act} + p_{act}$$

As a final instruction in the first case, the value of the last accepted time interval $I_{old}$ is set to the value of the current time interval $I_{act}$.

If in the second case, the computing time $R_{act}$ is by contrast greater than the limit value $GW_{act}$, and if the list ApproxList is empty, the system is not real-time capable. If the list ApproxList is not empty, an attempt is made to reduce the determined computing time $R_{act}$ in stages. This can be achieved as follows:

At first, the number Anz is increased. The number Anz can be doubled, for example. Then a check is made as to whether as a result of the increase, one or more tasks contained in the list ApproxList are no longer approximated. The tasks which are no longer approximated are determined. Those tasks are determined to which as a result of the increased number Anz a test limit $T_{max}(\tau)$ is assigned which is greater than the current time interval $I_{act}$. The tasks which are determined in this manner are removed from the list ApproxList and their next time interval, which is greater than $I_{act}$, is added to the list TestList. Then, the computing time $R_{act}$ is reduced by the no longer approximated tasks which are determined as described above. For periodic tasks, the error can be calculated in a time interval I as follows:

$$error = \left( \frac{I - d_i}{p_i} - \left| \frac{I - d_i}{p_i} \right| \right) \times c_i$$

Here, $d_i$, $p_i$ and $c_i$ refer to the time limit, period and system expenses, e.g. the computing time of a task $\tau_i$ of the task system $\tau_n$. The errors which are calculated in this manner are subtracted from the computing time $R_{act}$. If the reduced computing time $R'_{act}$ continues to be greater than the limit value $GW_{act}$, the increase in the number Anz has not yet been sufficient. The number Anz is further increased, for example, it is again doubled. The increase in the number is repeated until either the reduced computing time $R'_{act}$ is less than or the same as the limit value $GW_{act}$, or until the list ApproxList is empty. If as a result of the increase in number Anz the computing time $R'_{act}$ falls to below the limit value $GW_{act}$, the method is continued as in the first case. If for each increase in the number Anz the computing time $R'_{act}$ is greater than the limit value $GW_{act}$, the system is not real-time capable for the task system $\tau_n$.

With a third exemplary embodiment, the degree of approximation can be further reduced. The degree of approximation can be dynamically adapted to the requirements of the task system $\tau_n$, as a result of which the run time of the method can be further minimised. For example, for each time interval, a maximum number of tasks can be approximated. Here, the following method can be applied:

The time intervals are checked in order of size in increasing order. If it is determined that the computing time $R_{act}$ in a checked time interval is lower than the limit value $GW_{act}$, the number Anz is reduced in such a manner that the number of tasks for which an approximate value is used for the system expenses increases. In other words, the test limit $T_{max}(\tau)$ for at lest one task τ is displaced in such a manner that the task τ is approximated in the time interval $I_{act}$ or $I_{new}$.

With a fourth exemplary embodiment, the tasks r are approximated as early as possible, e.g. in each case after the first time interval $I^\tau_1$. This approximation can, as described above, be cancelled again. If an approximation is cancelled, an attempt can be made to re-introduce the approximation as soon as possible, e.g. in the next time interval. With the method, it is possible only to insert time intervals into the test list TestList when this occurs as a result of the cancellation of an approximation. The method enables an extensive approximation, and is fast and precise.

The fourth exemplary embodiment can be realised in the following manner, for example:

The first time intervals $I_1^\tau$ which result respectively from the first job of each individual task τ are added to the test list TestList. The time intervals $I_1^\tau$ in the test list TestList are then processed according to size in increasing order, i.e. the real-time capability of the system is checked for these intervals. All further time intervals I of the tasks are initially approximated, i.e. they are not included in the test list TestList. If real-time evidence fails for a time interval $I^\tau_1$, the approximation is cancelled step-by-step, as described above. This is conducted either until the real-time evidence for the checked time interval I has been provided, or until no further task can be approximated. If no further task can be approximated, the task system is not real-time capable. The cancellation of the approximation of a task leads to a time interval $I_i^\tau$, i>2 for this task τ being added to the test list TestList. Preferably, the time interval $I_i^\tau$ corresponds to the next largest time interval of the task τ which follows on from a time interval in which the test failed. The next largest time interval can be determined in the same manner as for the real-time analysis with a dynamic error. The real-time analysis ends when in a time interval, all tasks are approximated and/or the real-time $R_{act}$ is greater than the limit value $GW_{act}$.

With all the exemplary embodiments, a particularly low run time for the method can be achieved as a result of a significant reduction in the number of time intervals to be checked. Due to the fact that the degree of approximation can be adapted e.g. dynamically, it is possible to particularly precisely analyse the real-time capability of the system.

The method according to the invention can be implemented by a system, in particular, by a technical system, such as a computer system, in parallel to the processing of the task system. A check can be made in advance as to whether the tasks in the task system are processable in real-time. If for example it is determined that a real-time condition cannot be met for a specific future time point, it is possible to transfer individual tasks to other system components or other systems in order to process them more quickly. Due to a transfer of this type, it is possible in an advantageous case that the real-time condition can be met for the future time point. It is also possible to defer the processing of individual tasks. For example, the processing can be deferred of tasks which are not absolutely necessary for the safe operation of the system or for an emergency operation of the system. The functionality of the system can be improved.

The method according to the invention can also be used with a system with several interacting components. Information obtained with the method regarding the real-time capability of the components can be used to plan or determine a processing of tasks on the individual components in a suitable manner. The interaction of the components can be optimised and improved.

Furthermore, the method according to the invention can be used for the development of technical systems such as embedded real-time or computer systems, electronic circuits or control units or similar.

| List of references | |
|---|---|
| $\tau_n$ | Task system |
| τ | Task |
| τ' | Further task |
| Anz | Number |
| $c_i$ | Expenses |
| $d_\tau, d_i$ | Time limit |
| $GW_{act}$ | Limit value |
| I | Time interval |
| $I^\tau_{i\tau}$ | i-th time interval of a task τ |
| $I^\tau_{n_\tau}$ | Maximum time interval of a task τ |
| $I_{max}$ | Maximum time interval |
| $I_{act}$ | Current time interval |
| $I_{old}$ | Previous time interval |
| $n_\tau$ | Number of time limits |
| $p_i$ | Period |
| R | Computing time |
| $R_{act}$ | Current computing time |
| $T_{max}(\tau)$ | Test limit |

The invention claimed is:

1. A method executed by a computer program product stored in a memory and executed by a processor, for evaluating a real-time processing capability of a computer system, wherein tasks are to be executed by a target computer system, wherein a job is defined by executing of a task, and wherein a computing time which is required by the target computer system in order to execute the task corresponds to system expenses, the method comprising:
   a) specifying a time interval in which a predetermined set of tasks is to be executed, the time interval defining available system expenses,
   b) determining overall system expenses resulting from an execution of the predetermined set of tasks, the execution of the predetermined set of tasks corresponding to a quantity of jobs including a first quantity and a second quantity, the first quantity containing tasks wherein a number of jobs for each task does not exceed a predetermined maximum number of jobs and the second quantity containing tasks wherein a number of jobs for each task is greater than the predetermined number of jobs;
   wherein for the jobs of the first quantity, there are used actual system expenses and for the jobs of the second quantity, there are used approximate values of the actual system expenses, and
   wherein overall system expenses are calculated from a sum of the actual system expenses and approximate values of the actual system expenses;
   c) comparing the determined overall system expenses with available system expenses, wherein
      (i) if the overall system expenses do not exceed the available system expenses, the target computer system is regarded as having a capability of real-time processing within the time interval, and
      (ii) if the overall system expenses exceed the available system expenses, the second quantity is reduced by shifting at least one job from the second quantity to the first quantity and steps b) and c) are repeated, and
(iii) if the second quantity is empty and the overall system expenses exceed the available system expenses, the target computer system is regarded as not having a capability of real-time processing.

2. The method of claim 1, wherein the steps a) to c) are repeated wherein in step a) the time intervals are successively increased.

* * * * *